United States Patent
Hori

[19]

[11] Patent Number: 6,126,333
[45] Date of Patent: Oct. 3, 2000

[54] MANUAL FILM WINDING DEVICE OF A CAMERA

[75] Inventor: Masakatsu Hori, Tokyo, Japan

[73] Assignee: Asahi Kogaku Kogyo Kabushiki Kaisha, Tokyo, Japan

[21] Appl. No.: 08/914,807

[22] Filed: Aug. 20, 1997

[30] Foreign Application Priority Data

Aug. 20, 1996 [JP] Japan .................................... 8-238583

[51] Int. Cl.⁷ .............................. G03B 19/12; G03B 1/00
[52] U.S. Cl. .......................... 396/354; 396/395; 396/396; 396/401; 396/403; 396/411
[58] Field of Search ..................................... 396/354, 395, 396/396, 397, 401, 402, 411, 403

[56] References Cited

U.S. PATENT DOCUMENTS

| | | | |
|---|---|---|---|
| 3,221,626 | 12/1965 | Fuketa ....................................... | 396/402 |
| 3,754,454 | 8/1973 | Nakamura et al. ....................... | 396/401 |
| 3,774,514 | 11/1973 | Okamoto et al. ......................... | 396/266 |
| 3,913,117 | 10/1975 | Endo et al. ............................... | 396/480 |
| 4,193,678 | 3/1980 | In Son ...................................... | 396/401 |
| 4,236,800 | 12/1980 | Satoh ........................................ | 396/400 |
| 4,322,152 | 3/1982 | Satoh et al. .............................. | 396/502 |
| 5,774,755 | 6/1998 | Stanchus et al. ......................... | 396/411 |

*Primary Examiner*—Eddie C. Lee
*Attorney, Agent, or Firm*—Greenblum & Bernstein, P.L.C.

[57] ABSTRACT

A manual film winding device of a camera has a winding lever which is manually rotated between a winding start position and a winding end position. Also provided are a ratchet mechanism having a ratchet wheel, which is rotated in association with the winding lever's rotation, and a ratchet pawl which engages with the ratchet wheel. The ratchet wheel rotates in a winding direction when the winding lever rotates from the winding start position to the winding end position, and in a reverse direction, opposite to the winding direction, when the winding lever rotates from the winding end position to the winding start position. A film advance driving system operates in association with the ratchet wheel's rotation in the winding direction. The ratchet pawl is arranged to rotate toward a first direction in connection with the winding rotation of the ratchet wheel, and to rotate toward a second direction in connection with the reverse rotation of the ratchet wheel. A double winding preventing mechanism is provided for restraining rotation of the ratchet pawl in the first direction to prevent the ratchet wheel from rotating in the winding direction. A control device holds the ratchet pawl in a reset state, in which the rotation of the ratchet pawl toward the first direction is restrained, and clears the reset state by a signal supplied in response to a shutter release operation.

18 Claims, 5 Drawing Sheets

MANUAL FILM WINDING DEVICE OF A CAMERA

BACKGROUND OF THE INVENTION

1. Field of the Invention

The present invention relates to a manual film winding device of a single lens reflex (SLR) camera in which a quick return mirror and a focal plane shutter are charged in association with a manual winding mechanism and the manual winding operation thereof.

2. Description of the Related Art

In general, an SLR camera, for example, an SLR camera using a Brownie film (120 type or 220 type i.e., medium format film) (hereinafter referred to as a Brownie film camera) uses a manual film winding mechanism. In such a camera, a focal plane shutter and a quick return mirror are arranged to be charged in association with the film winding mechanism.

Conventionally, such a Brownie film camera includes a manual film winding lever and a roller which is rotated by the swinging operation of the film winding lever to advance a film. The camera is provided with a film advance stop mechanism which prevents the film from advancing more than one frame length when the roller rotation reaches a predetermined rotation amount (film advance amount of one frame) even though the winding lever does not reach a final winding end position.

The camera is also provided with a double winding preventing mechanism and a film loading (feeding) mechanism. The double winding preventing mechanism inhibits the winding operation of the film winding lever unless the shutter is released. The film loading (feeding) mechanism advances the film to the position where the first frame faces an aperture of the camera in connection with the winding operation of the winding lever. The film is advanced to the position without charging the focal plane shutter and the quick return mirror after a start mark formed on a backing paper of a Brownie film loaded in the camera is aligned to an index provided on the camera body.

However, the film advance stop mechanism, the double winding preventing mechanism and the film loading mechanism in the conventional Brownie film camera described above, are all mechanically configured by levers, gear trains, and the like. In addition, the Brownie film camera has to accommodate two types of Brownie films, namely type 120 and 220, which differ in the number of frames which can be taken. Accordingly, the camera is configured to select one of two cam gears by actuacting a manual switch. Each cam gear has a different shape corresponding to one of the two film types.

The above mentioned conventional Brownie film camera system is completely mechanically configured, and consequently suffers from a number of disadvantages. Namely, the configuration is complex, high machining accuracy is required, and the number of components as well as the cost is high.

SUMMARY OF THE INVENTION

It is an object of the present invention to provide a manual film winding device in a camera having a simple mechanical configuration of a double winding preventing mechanism which is operatively associated with a winding lever.

It is another object of the present invention to provide a manual film winding device in a camera having a simplified mechanical configuration of a charge permitting mechanism for use during film loading and one-frame winding of a film. A low cost charge permitting mechanism which is not influenced by component accuracy is also provided.

According to one aspect of the present invention, there is provided a manual film winding device of a camera having a winding lever which is manually rotated between a winding start position and a winding end position. Also provided are a ratchet mechanism having a ratchet wheel, which is rotated in association with the rotation of the winding lever, and a ratchet pawl which engages with the ratchet wheel. The ratchet wheel is rotated in a winding direction when the winding lever is rotated from the winding start position to the winding end position. The ratchet wheel is also rotated in a reverse direction opposite to the winding direction, when the winding lever is rotated from the winding end position to the winding start position. A film advance driving system is operated in association with the rotation of the ratchet wheel in the winding direction. The ratchet pawl is arranged to rotate toward a first direction in connection with the winding rotation of the ratchet wheel, and to rotate toward a second direction opposite to the first direction, in connection with the reverse rotation of the ratchet wheel. A double winding preventing mechanism is provided for restraining the rotation of the ratchet pawl toward the first direction to prevent the ratchet wheel from rotating in the winding direction. A control device holds the ratchet pawl in a reset state in which the rotation of the ratchet pawl toward the first direction is restrained. The control device clears the reset state by a signal which is supplied in response to a release operation of a shutter.

The shutter is preferably a focal plane shutter having a leading curtain and a trailing curtain. The signal which is supplied in response to the shutter release operation is a travel completion signal of the trailing curtain.

The ratchet mechanism is arranged to prevent a returning movement of the winding lever toward the winding start position. The movement is prevented by retaining the ratchet pawl against the ratchet wheel when the winding operation of the winding lever is stopped between the winding start and end positions.

The double winding preventing mechanism preferably consists of a first winding locking lever which is rotated to a locking position by the rotation of the ratchet pawl in the second direction. The locking position is a position where the rotation of the ratchet pawl toward the first direction is prevented by the first locking lever. The first winding locking lever is arranged to be engaged with the ratchet pawl to lock the rotation of the ratchet wheel so that the rotation of the winding lever in the winding direction is prevented.

The double winding preventing mechanism preferably further consists of a second winding locking lever, one end of which is coupled to the first winding locking lever and the other end of which is coupled to the control device. The second winding locking lever is arranged to hold the ratchet pawl in the reset state by transmitting the motion of the first winding locking lever to the control device. The ratchet pawl is held in the reset state when the first winding locking lever is rotated to the position where the rotation of the ratchet pawl toward the first direction is prevented. The second winding locking lever is also arranged to rotate the first winding locking lever to the other position when the control device undergoes a reset clearing operation. When in the other position, the ratchet pawl is not restrained from rotating toward the first direction.

The first winding locking lever is preferably biased toward a position where the ratchet pawl is prevented from rotating toward the first direction.

A battery existence transmitting lever is preferably provided which operates in response to the presence or non-presence of a battery in the camera. The battery existence transmitting lever brings the double winding preventing mechanism into the reset state when a battery is not loaded.

The control device preferably consists of a movable element, a magnet and an electromagnetic coil. The movable element is coupled to the double winding preventing mechanism and brings the double winding preventing mechanism into the reset state. The magnet is for holding the reset state by attracting the movable element. The electromagnetic coil is for clearing the reset state by decreasing an attractive force of the magnet. By passing a current through the coil in response to a signal which is supplied when the shutter is released, the attractive force is decreased.

Either a shutter charge driving system or a mirror charge driving system is preferably provided. The driving system operates in association with the rotation of the winding lever from the winding start position to the winding end position.

Also provided is a film advance stop mechanism for stopping film movement by the film advance driving system. The film movement is stopped when a film advancing amount wound up by the film advance driving system reaches a predetermined amount. A film feeding amount detecting device and a second control device are also preferably provided. The film feeding amount detecting device is for detecting the film feeding amount wound up by the film advance driving system. The second control device is for controlling the film advance stop mechanism in response to a signal which is supplied when the film advancing amount detecting device detects the predetermined film feeding amount.

According to another aspect of the present invention, a manual film winding device of a camera is provided having a winding lever which is manually rotated between a winding start position and a winding end position. A film advance driving system is operated in association with the winding operation of the winding lever. A shutter charge driving system is operated in association with the winding operation of the winding lever. A coupling mechanism is provided for providing a coupled state and an uncoupled state. In the coupled state, the winding lever and the shutter charge driving system are connected so that the shutter charge driving system is operatively associated with the winding operation of the winding lever. In the uncoupled state, the winding lever and the shutter charge driving system are separated so that the shutter charge driving system is not operatively associated with the winding operation of the winding lever. A charge permitting mechanism brings the coupling mechanism into the uncoupled state when the film is fed to a pre-stop position where one-windup length is left from a loading starting position by the film advance driving system. The charge permitting mechanism brings the coupling mechanism into the coupled state when the film frame-by-frame from the pre-stop position in a shutter charge possible state. A control device is also provided for controlling the charge permitting mechanism.

Preferably, the coupling mechanism consists of a pin and a charge switching lever. The pin is provided on the winding lever eccentrically from a pivoting axis of the winding lever. The charge switching lever is pivotally mounted on the shutter charge driving system, and is engageable to and disengageable from the pin. The charge switching lever is biased toward a direction to be engaged with the pin.

The charge permitting mechanism is preferably arranged to bring the coupling mechanism into the uncoupled state when the winding lever is returned from the winding end position to the winding start position. The charge permitting mechanism preferably consists of a charge permitting lever which is pivotally moved for detaching the charge switching lever from the pin. The charge permitting lever is arranged to be moved by the control device between a position engaging the pin and a position disengaging from the pin.

The control device preferably consists of a movable element, a magnet and an electromagnetic coil. The movable element is coupled to the charge permitting mechanism and brings the charge permitting mechanism into the shutter charge possible state. The magnet is for holding the shutter charge possible state by attracting the movable element. The electromagnetic coil is for clearing the shutter charge possible state by decreasing an attractive force of the magnet. By passing a current through the coil in response to the signal which is supplied every time a film is advanced frame-by-frame from the pre-stop position, the attractive force is decreased.

A film feeding amount detecting device is preferably provided for detecting the film feeding amount wound up by the film advance driving system. The film feeding amount detecting device supplies the control device with a signal for setting the shutter charge possible state when the film feeding amount detecting device detects that the film is fed to a pre-stop position. The pre-stop position is where one-windup length is left from a loading starting position upon loading a film.

In yet another aspect of the present invention, a manual film winding device of a camera is provided having a winding lever which is manually rotated between a winding start position and a winding end position. A film advance driving system is operated in association with the winding operation of the winding lever. A shutter charge driving system is operated in association with the winding operation of the winding lever. A mirror charge driving system is operated in association with the winding operation of the winding lever. A driving mechanism drives the shutter charge driving system and the mirror charge driving system in association with the rotation of the winding lever from the winding start position to the winding end position. A double winding preventing mechanism prevents double advancing of a film by holding the winding lever in a locking state unless a shutter, which is charged by the shutter charge driving system, is released.

A device is provided for holding the winding lever in an inoperable state in which the movement of the winding lever, from the winding end position to the winding start position, prevents the rotation of the winding lever, from the winding start position to the winding end position. A device is provided for clearing the inoperable state of the holding device so that the winding lever is rotatable, from the winding start position to the winding end position, in response to a signal which is supplied when the shutter is released.

According to yet another aspect of the present invention, a manual film winding device of a camera is provided having a winding lever which is manually rotated between a winding start position and a winding end position. A film advance driving system is operated in association with the winding operation of the winding lever. A shutter charge driving system is operated in association with the winding operation of the winding lever. The winding lever and the shutter charge lever are separated when a film is fed to a pre-stop position. The pre-stop position is where one windup length is left from the loading starting position upon loading the film by the winding operation of the winding lever. The shutter charge driving system is operatively associated with the winding operation of the winding lever when the film is fed frame by frame from the pre-stop position.

According to yet another embodiment of the present invention, a manual film winding device of a camera is provided having a winding lever. The winding lever is manually rotated between a winding start position and a winding end position, to wind the film and to charge a shutter. A double winding preventing mechanism prevents double advancing of the film by holding the winding lever in an inoperable position. While in the inoperable position, the rotation of the winding lever, from the winding start position to the winding end position, is prevented unless the shutter is released after the film is wound. A device is provided for holding the winding lever in the inoperable state by the movement of the winding lever from the winding end position to the winding start position. A device is also provided for clearing the inoperable state of the holding device so that the winding lever is rotatable, from the winding start position to the winding end position, in response to a signal supplied when the shutter is released.

The present disclosure relates to subject matter contained in Japanese Patent Application No.08-238583 (filed on Aug. 20, 1996) which is expressly incorporated herein by reference its entirety.

BRIEF DESCRIPTION OF THE DRAWINGS

The invention will be described below in detail with reference to the accompanying drawings, in which.

DESCRIPTION OF THE PREFERRED EMBODIMENT

An embodiment of the present invention will be described hereinafter in detail with reference to the drawings.

Figure 1:
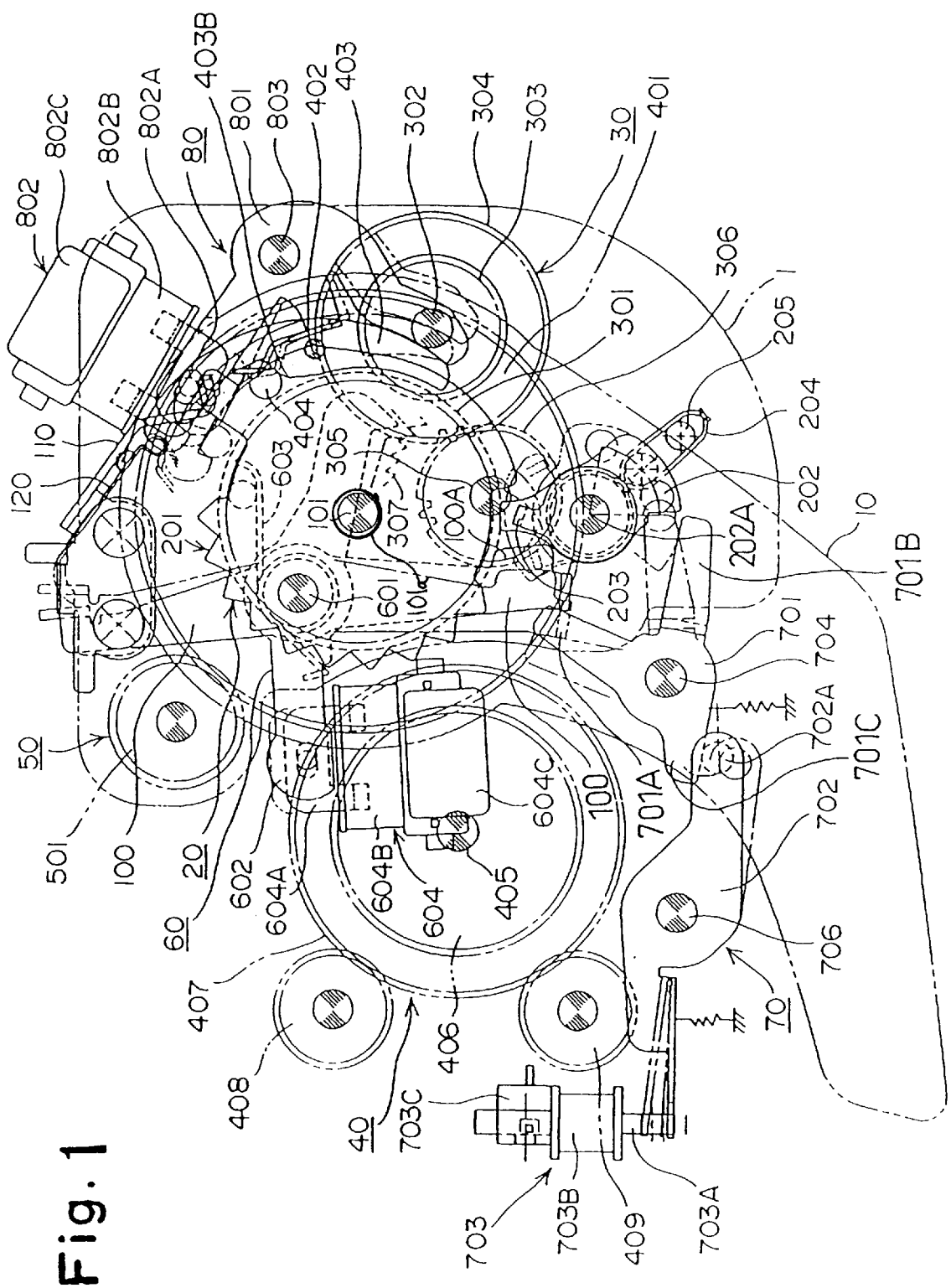
FIG. 1 is a schematic top view showing a configuration of an embodiment of a manual film winding device of a Brownie film camera according to the present invention.
Figure 2:
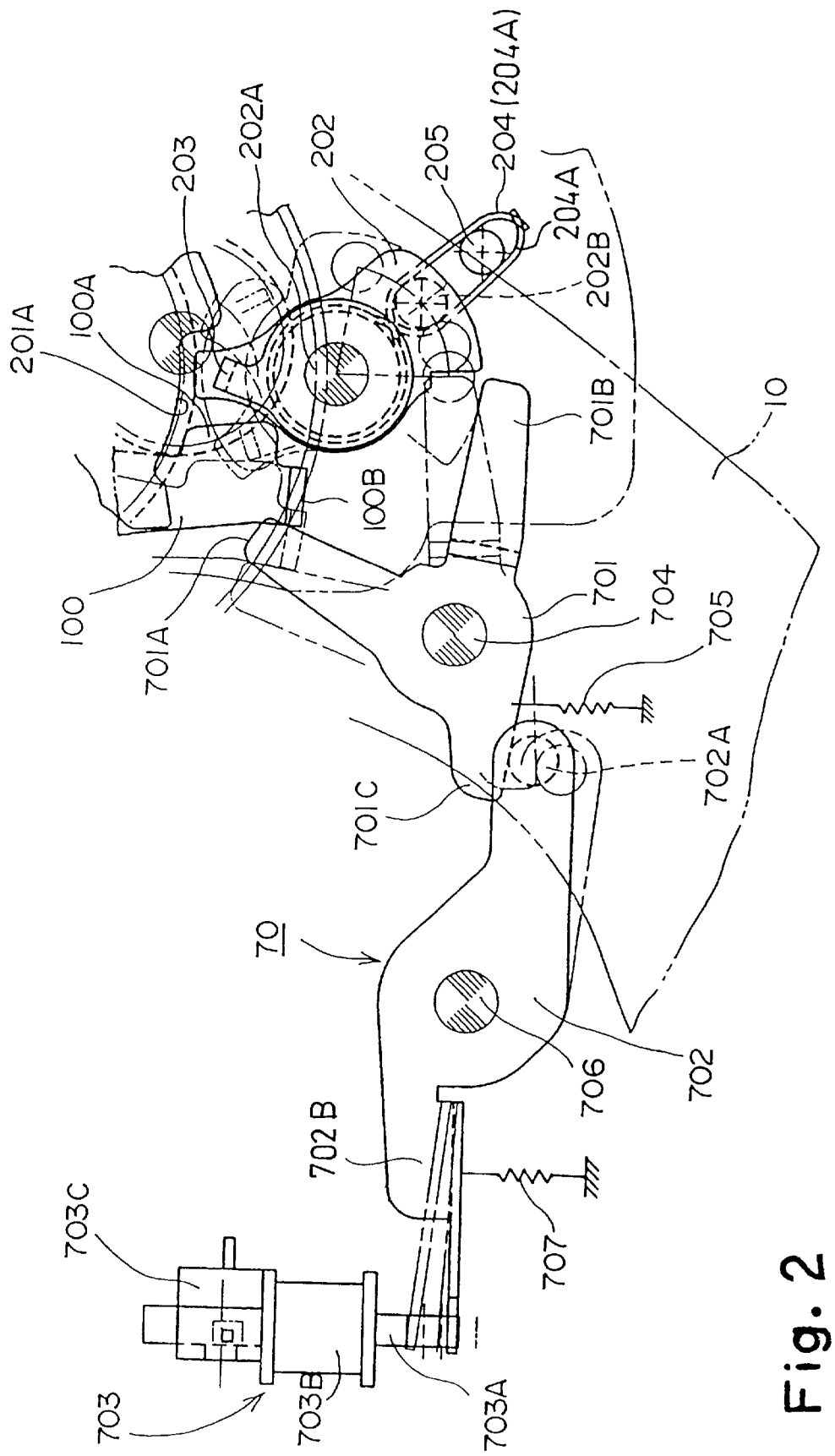
FIG. 2 is an enlarged top view of a double winding preventing mechanism portion of the present invention.
Figure 3:
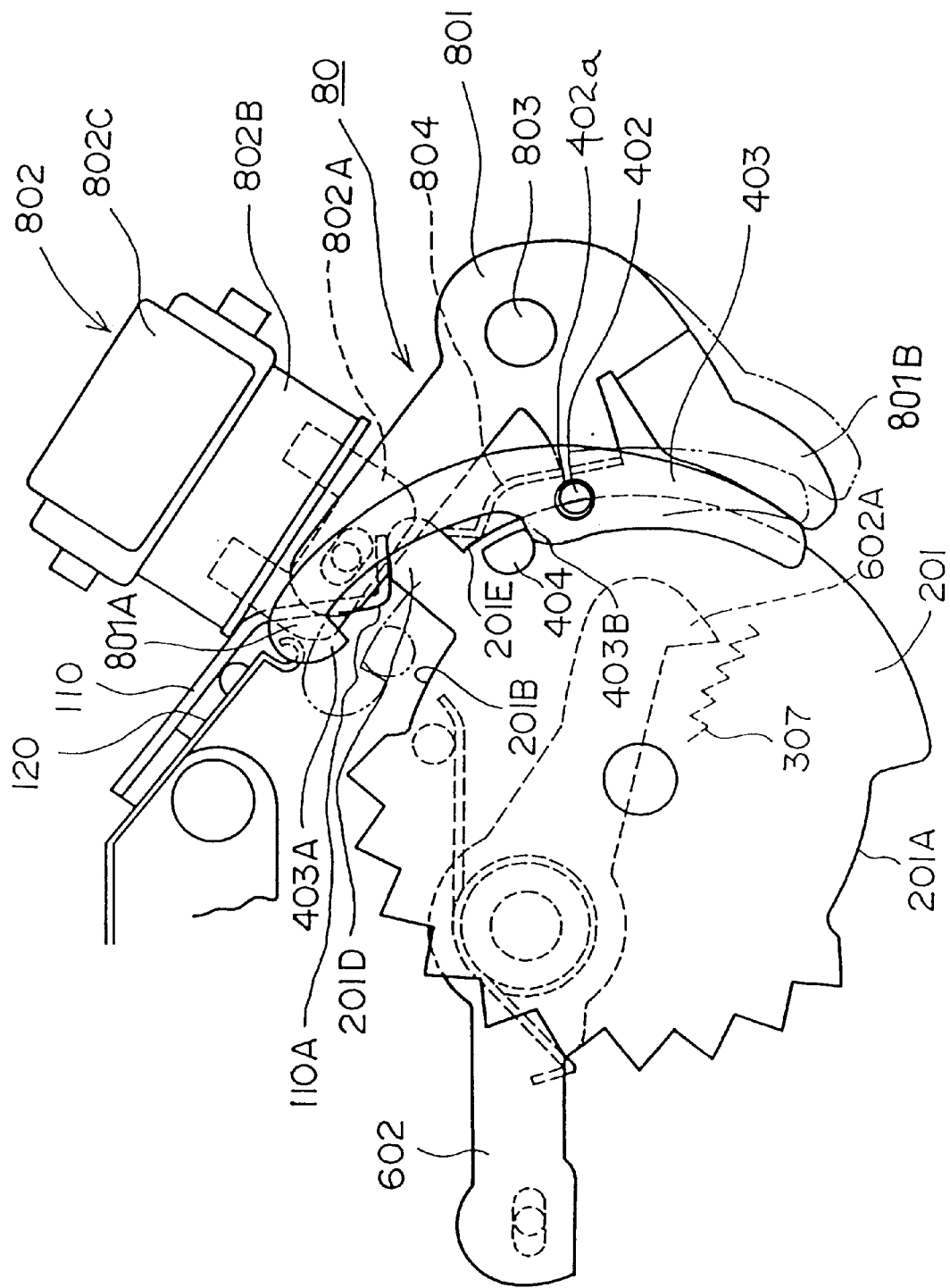
FIG. 3 is an enlarged top view of a charge permitting mechanism portion of the present invention.

Referring to FIGS. 1 through 3, a film winding device of a camera includes a winding lever 10, a ratchet mechanism 20, a film advance driving system 30, a shutter charge driving system 40, and a mirror driving system 50. The ratchet mechanism 20 is for retaining the winding lever 10 in place if the winding lever 10 is released in the middle of a winding operation. The film advance driving system 30 is operated in association with the winding operation of the winding lever 10. Also included are a film advance stop mechanism 60, a double winding preventing mechanism 70 and a charge permitting mechanism 80. The film advance stop mechanism 60 inhibits the film from advancing regardless of the winding operation of the winding lever 10 when a predetermined film transport amount of film is fed in the film advancing direction. The double winding preventing mechanism 70 is for preventing the film from being wound-up again before releasing a shutter after the film has already been wound-up once. The charge permitting mechanism 80 is for determining whether or not to permit a shutter charge and a mirror charge.

The winding lever 10 is disposed on a top plate 1 so as to be pivotally supported about a shaft 101 between a winding start position (lever housed position) and a winding end position, and is biased to automatically return to the winding start position by a torsion spring (101a) or the like. The winding angle of the winding lever between the winding start position and the winding end position is set to approximately 180 degrees.

The ratchet mechanism 20 includes a ratchet wheel 201 which is coaxially fixed to the shaft 101 of the winding lever 10, and a ratchet pawl 202. The ratchet pawl 202 is pivotally supported on the top plate 1 by a shaft 202A and engages the ratchet wheel 201. A rotational angle of the ratchet wheel 201 is defined by a stopper (201F) so as to be rotated within an angular range of approximately 180 degrees between the pivot start and end positions of the winding lever 10.

The ratchet wheel 201 has a first cutout portion 201A and a second cutout portion 201B within respective prescribed ranges of the central axes, which are located at an angle corresponding to an angle between the pivot start and end positions of the winding lever 10 (a single winding angle). Triangular ratchet teeth 201C with which the ratchet pawl 202 engages, are provided in the circumferential periphery between the first and second cutout portions 201A and 201B. Further, a radially extending protrusion 201D is provided in a portion adjacent to the second cutout portion 201B, and a cam portion 210E is provided adjacent to the protrusion 201D.

When the winding lever 10 is at the winding start position, the ratchet pawl 202 is positioned opposed to the first cutout portion 201A of the ratchet wheel 201. The ratchet wheel 202 has an integrally-formed setting lever 203 which brings the double winding preventing mechanism 70 into a reset state.

The ratchet pawl 202 is coaxially equipped with a torsion spring 204 which has a pair of legs 204A extending in a radial direction after crossing each other. Both ends of the legs 204A are engaged so as to interpose therebetween a spring hooking dowel 202B protruding through one end of the ratchet pawl 202. Further, each end of the legs 204A of the spring 204 is retained by a fixed pin 205.

Thereby, when the other end of the ratchet pawl 202 faces the first cutout portion 201A or the second cutout portion 201B, the ratchet pawl 202 is held in a neutral position, as shown in FIG. 1. The ratchet pawl 202 rotates in a first direction cooperating with a rotation in a winding direction of the ratchet wheel 201 during the winding operation of the winding lever 10 from its winding start position to its winding end position. The ratchet pawl 202 also rotates in a second direction, which is opposite to the first direction, cooperating with a rotation in a returning movement of the ratchet wheel 201 during the returning movement of the winding lever 10 from its winding end position to its winding start position. Further, when the winding lever 10 is rotated in the winding direction, the winding operation is allowed by an intermittent engagement of the other end of the ratchet pawl 202 with the ratchet teeth 201C of the ratchet wheel 201. When the winding lever 10 is released in the middle of winding, the other end of the ratchet pawl 202 is retained by one of the ratchet teeth 201C to lock the winding lever 10, preventing its return.

The film advance driving system 30 includes a first gear 301, a second gear 303, a third gear 304 and a ratchet wheel 307. The first gear 301 is coaxially secured to the shaft 101 of the winding lever 10. The second gear 303 is meshed with the first gear 301 and is secured to a shaft 302 which is rotatably supported on the top plate 1. The third gear 304 is coupled with a one way clutch (not shown). The fourth gear 306 is meshed with the third gear 304 and is rotatably supported on a spool shaft 305 which is rotatably supported on the top plate 1. The ratchet wheel 307 is connected to a spool which is coaxially coupled to the fourth gear 306 through a friction clutch (not shown). The one way clutch coupled with the third gear 304 transmits the unidirectional rotation thereof for the film winding to the fourth gear 306. A rotation of the ratchet wheel 307 causes an actual film advance.

As shown in FIGS. 1 and 3, the shutter charge driving system 40 includes a main winding gear 401, which is rotatably coupled to the shaft 101 of the winding lever 10, and a charge switching lever 403. The charge switching lever 403 is rotatably supported, by a pin 402, at approximately a middle position thereof on a surface of the main winding gear 401 near the outer radius of the main winding gear 401. The charge switching lever 403 is provided with a hook 403A. The charge switching lever 403 is biased by a spring (402a) in a direction (counterclockwise as viewed in the Figures) to engage the hook 403A with a charge switching pin 404 which projects through the ratchet wheel 201 of the ratchet mechanism 20.

The shutter charge driving system 40 further includes a shutter charge gear 406, a vertically arranged upper and lower gear set 407, and a leading and trailing curtain pinion gear 408,409. The shutter charge gear 406 is meshed with the main winding gear 401 and is rotatably supported by a shaft 405 on the top plate 1. The vertically arranged upper and lower gear set (charge gear set) 407 is for leading and trailing curtains of a focal plane shutter which is coaxially mounted on the shaft 405. The leading curtain pinion gear 408 is meshed with the upper gear of the charge gear set 407. The trailing curtain pinion gear 409 is meshed with the lower gear of the charge gear set 407. The leading curtain gear 407 and the trailing curtain gear 408 are arranged to cooperate the leading and trailing curtains of a known focal plane shutter with the winding operation of the winding lever 10 for charging the shutter.

Further, the charge switching lever 403 is provided with a stepped portion 403B at a position near the pivoting center thereof. The stepped portion 403B engages with the charge switching pin 404 of the ratchet wheel 201 during the return movement of the winding lever 10 to simultaneously rewind the main winding gear 401 together with the winding lever 10.

The mirror charge driving system 50 is equipped with a mirror charge gear 501 which is meshed with the main winding gear 401. The mirror charge gear 501 charges a known quick return mirror mechanism by a rotation thereof.

The film advance stop mechanism 60 includes a retaining lever 602 which is rotatably supported at a center thereof on a shaft provided on the top plate 1. The retaining lever 602 is provided with a retaining portion 602A at one end thereof, which engages with and disengages from the spool ratchet wheel 307 of the film advance driving system 30. The retaining lever 602 is biased by a torsion spring 603 in a clockwise direction (a direction in which the retaining portion 602A rests against the ratchet wheel 307). A retaining control device 604 is coupled to the other end of the retaining lever 602.

The retaining control device 604 includes a movable element 604A, a magnet 604B and an electromagnetic coil 604C. The movable element 604A is coupled to the other end of the retaining lever 602. The magnet 604B holds the retaining lever 602 in a reset state, in which the lever 602 does not rest against the ratchet wheel 307, by attracting the movable element 604A. The electromagnetic coil 604C allows the reset state of the retaining lever 602 to be cleared by decreasing the attractive force of the magnet 604B. The attractive force of the magnet is decreased by passing a current therethrough when a predetermined film advance amount has been reached.

A signal from a film transport amount detecting device 90 (described later in detail with reference to FIG. 5) controls the timing for energizing the electromagnetic coil 604C of the retaining control device 604. The retaining lever 602 is arranged to be reset by a trailing curtain running completion lever (not shown) which is actuated when the running of the trailing curtain of the focal plane shutter is complete.

In FIG. 1, reference number 100 indicates a battery existence transmitting lever which transmits to the double winding preventing mechanism 70 when a battery is placed in a battery holder of the camera body. The center portion of the battery existence transmitting lever 100 is rotatably mounted to the shaft 601 of the retaining lever 602. At one end of the battery existence transmitting lever, as shown in FIG. 2, a protrusion 100A and an engagement portion 100B are formed. The engagement portion 100B is formed by bending the protrusion 100A upward. The protrusion 100A rests against the setting lever 203 of the ratchet mechanism 20 when the ratchet pawl 202 engages the ratchet teeth 201C of the ratchet wheel 201 and rotates counterclockwise (the second rotating direction) from a state shown in FIG. 1 during a return movement of the winding lever 10 from its winding end position to its winding start position.

As shown in FIGS. 1 and 2, the double winding preventing mechanism 70 is provided with a first winding locking lever 701, a second winding locking lever 702, and a locking control device 703.

The first locking lever 701 has a Y-shaped planar shape having a first engagement arm 701A and a second engagement arm 701B. A center of the first locking lever 701 is rotatably supported on the camera body (not shown) through a shaft 704. The first locking lever 701 is biased counterclockwise by a spring 705.

Figures 4A, 4B, 4C:
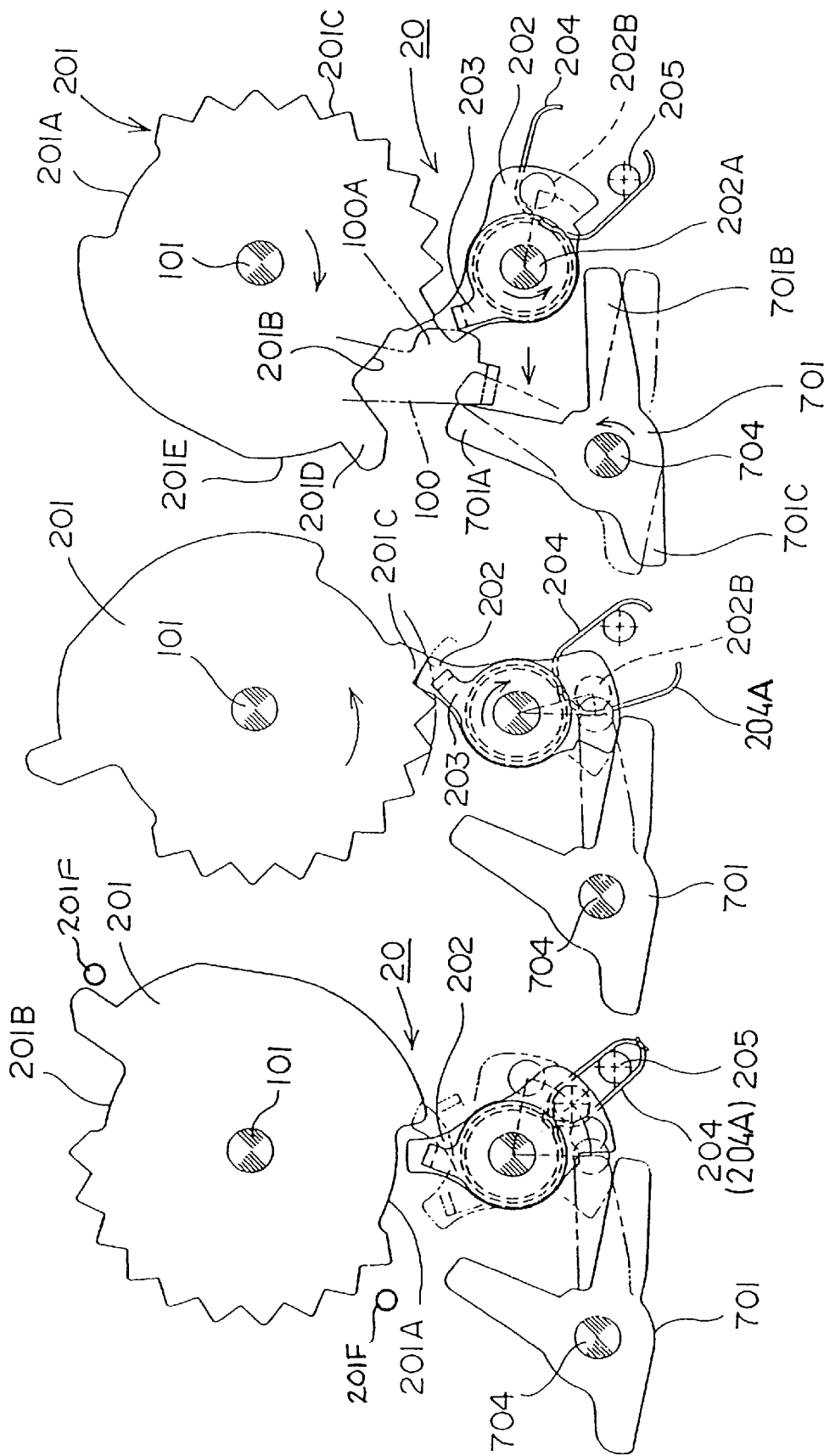
FIGS. 4A, 4B and 4C are explanatory drawings showing an operational relation between a ratchet wheel and a ratchet pawl in different states according to the present invention.

The first engagement arm 701A is placed against the engagement portion 100B of the battery existence transmitting lever 100 from the side opposite to the setting lever 203. Accordingly, the first winding locking lever 701 rotates counterclockwise when the ratchet pawl 202 is rotated in the second direction, as shown in FIG. 4C by the ratchet teeth 201C of the ratchet wheel 201. The counterclockwise rotation is in response to the return operation of the winding lever 10 from its winding end position to its winding start position through a turning movement of the battery existence transmitting lever 100.

The second engagement arm 701B is positioned to be engaged with the spring hooking dowel 202B of the ratchet pawl 202 when the first winding locking lever 701 is rotated counterclockwise. When the winding operation is applied to the winding lever 10 before the shutter is released in the state mentioned above, the spring hooking dowel 202B of the ratchet pawl 202 comes into contact with the second engagement arm 701B. The contact is for the purpose of locking the clockwise turning of the ratchet pawl 202 and locking the ratchet wheel 201, thereby the winding of the film is prevented.

The second winding locking lever 702 is rotatably supported on the camera body through a shaft 706 and is positioned adjacent to the first winding locking lever 701. The second winding locking lever 702 is biased counterclockwise by a spring 707. One end of the second winding locking lever 702 is engaged with a third engagement arm 701C of the first winding locking lever 701 through a dowel 702A. The other end thereof is coupled to the locking control device 703.

The locking control device 703 includes a movable element 703A, a magnet 703B and an electromagnetic coil 703C. The movable element 703A is coupled to the other end 702B of the second winding locking lever 702. The magnet 703B holds the first and second winding locking levers 701, 702 at a double winding preventing position (the reset state indicated by the two dotted lines in FIGS. 1 and 2) by attracting the movable element 703A. The electromagnetic coil 703C allows a release of the first and second winding locking levers by decreasing the attractive force of the magnet 703B, by passing a current therethrough, in response to a shutter release operation.

A signal supplied in response to the shutter release operation is issued upon completion of the running of the trailing curtain of the focal plane shutter (completion of the shutter release operation).

As shown in FIGS. 1 and 3, the charge permitting mechanism 80 includes a charge permitting lever 801 disposed adjacent to the main winding gear 401 and a charge permitting control device 802 for operating the charge switching lever 403 through the charge permitting lever 801.

The charge permitting lever 801 is shaped like a letter "L" having a first arm 801A and a second arm 801B, and is supported on the top plate 1 so as to be rotatable in a horizontal direction through a shaft 803. The first arm 801A is coupled to the charge permitting control device 802 while the second arm 801B is placed against the charge switching lever 403 at a side opposite to the hook 403A.

In addition, the charge permitting lever 801 is integrally provided with a reset lever 804 between the first arm 801A and the second arm 801B. The reset lever 804 is a kind of leaf spring which extends to the side of the ratchet wheel 201. The leaf spring engages with the cam portion 201E formed adjacent to the protrusion 201D in the periphery of the ratchet wheel 201 when the winding lever 10 is returned to its winding start position. Accordingly, the charge permitting lever 801 is allowed to rotate clockwise to recover the reset state in which charging of the mirror shutter is not permitted when the hook 403A of the charge switching lever 403 is disengaged from the charge switching pin 404.

The charge permitting control device 802 includes a movable element 802A coupled to one end of the charge permitting lever 801, a magnet 802B, and an electromagnetic coil 802C for clearing the reset state of the charge permitting lever 801 and the charge switching lever 403. The magnet 802B holds the movable element 802A in a reset state in which charging is not permitted by attracting the movable element 802A to pivotally move the charge permitting lever 801 and the charge switching lever 403.

In FIGS. 1 and 3, reference numbers 110 and 120 respectively indicate a first preliminary angular switch and a second preliminary angular switch. The first preliminary angular switch 110 is turned ON when the winding lever 10 is rotated a predetermined angle in the winding direction from the winding start position thereof. The second preliminary angular switch 120 is turned ON when the winding lever 10 is moved a predetermined angle, which is larger than the predetermined angle for the first preliminary angular switch 110, from its winding start position.

The first preliminary switch 110 and the second preliminary switch 120 are disposed in the circumferential periphery of the ratchet wheel 201. Both switches 110, 120 are electrically insulated from the top plate 1. The protrusion 201D of the ratchet wheel 201 is placed against the preliminary angular switches 110 and 120 in sequence, and the ON signal is supplied using the ratchet wheel 201 to establish a ground. Current is supplied to the electromagnetic coil 802C when an ON signal is given by the second preliminary angular switch 120.

In addition, the first preliminary angular switch 110 is provided with spring characteristics having a click 110A at a tip thereof which is engaged with the protrusion 201D of the ratchet wheel 201. The winding lever 10 is arranged so that the pivoting position thereof is maintained if the winding lever 10 is released when the protrusion 201D moves past the click 110A by moving the winding lever 10 through a predetermined angle (preliminary angle) in the winding direction from the winding start position.

Figure 5:
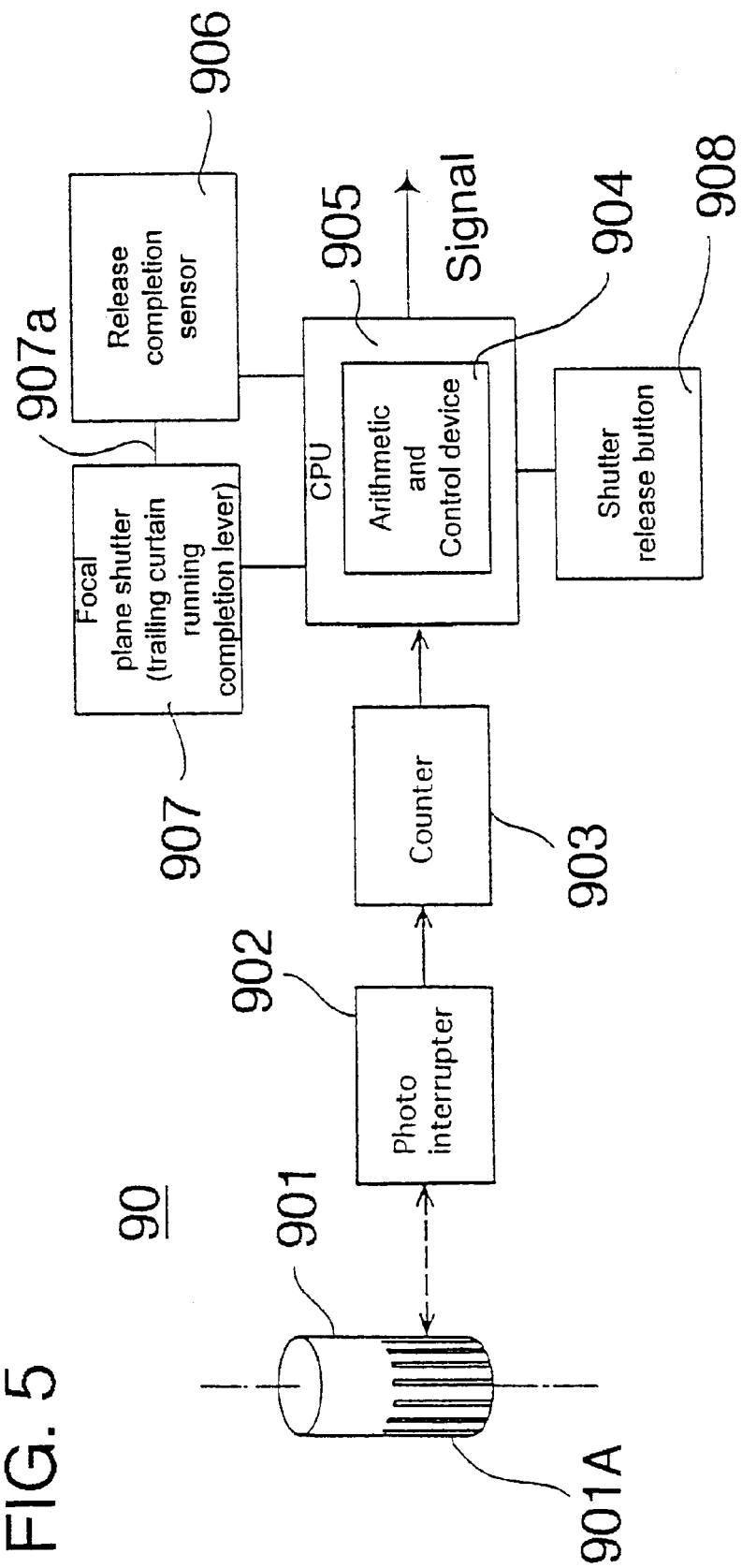
FIG. 5 is a block diagram showing a configuration of film feeding amount detecting device according to the present invention.

In the manual film winding device of the present embodiment, the film feeding amount detecting device 90 is provided, as shown is FIG. 5. The detecting device 90 includes a roller 901, a photointerrupter 902, a counter 903 which counts the pulses from the photointerrupter 902, and an arithmetic and control device 904. The roller 901 rotates in association with and in response to the feeding amount of the Brownie film and has a light and shadow pattern 901A having a constant pitch around the perimeter. The photointerrupter 902 optically detects a light-shadow change provided in connection with the rotation of the roller 901 and supplies pulses corresponding to the angle of rotation. The arithmetic and control device 904 calculates the film feeding amount which corresponds to the length of a frame and the length from the start mark of the Brownie film to the position where the first frame thereof faces the aperture of the camera body.

The operation of the embodiment arranged as mentioned above will now be described.

First, when a Brownie film (not shown) is loaded into the camera, the start mark printed on a backing paper of the film is aligned with an index in the camera body. The back cover of the camera body is then closed, and the first frame is advanced to face an aperture of the camera body according to the following manner.

The winding lever 10 in FIG. 1 is repeatedly rotated between its winding start position to its winding end position. When the winding lever 10 is rotated in the film winding position, i.e., in a counterclockwise direction from its winding start position, as the protrusion 201D of the ratchet wheel 201, which is rotated integrally with the winding lever 10, is placed against the first preliminary angular switch 110, the first preliminary angular switch 110 is turned ON. Thereafter, as the protrusion 201D moves past the first preliminary angular switch 110 and is placed against the second preliminary angular switch 120, the first preliminary angular switch 110 is turned OFF and the second preliminary angular switch 120 is turned ON. An ON-signal of the second preliminary angular switch 120 activates the photointerrupter 902, the counter 903 and the arithmetic and control device 904.

At this time, the charge permitting lever 801 of the charge permitting mechanism 80 is in a reset state in which the lever 801 is attracted to the magnet 802B of the charge permitting control device 802. Therefore a hook 403A of the charge switching lever 403 is held in a charge impossible state in which the hook 403A is not engaged with the charge switching pin 404.

In this state, the winding lever 10 is further rotated in the film winding direction, then the gear 301 is rotated together with the winding lever 10 and the rotation of the gear 301 in the winding direction is transmitted to the spool shaft 305. The transmission is through the gears 303, 304, 306, the friction clutch (not shown) coupled with the gear 304 and the spool ratchet wheel 307. Consequently, the film advances. As the roller 901 rotates in connection with this film advance, the photointerrupter 902 optically detects the light-shadow change of the light and shadow pattern 901A. Then, the counter 903 issues pulses supplied in response to the rotational angle of the roller 901. The discrete value obtained by the counter 903 is captured in the arithmetic and control device 904 which judges whether the film is fed from the start mark to a pre-stop position where one frame windup length is left before the first frame reaches the aperture of the camera body.

During the reciprocal rotational movement of the winding lever 10, when the winding lever 10 is rotated in the returning direction from the winding end position, namely when the winding lever 10 is rotated after the second cutout portion 201B is pivotally moved to the position opposed to the ratchet pawl 202, by an angle corresponding to the second cutout portion 201B, the ratchet pawl 202 is rotated counterclockwise. The counterclockwise rotation, or rotation in the second direction, occurs while the ratchet pawl 202 resists the spring 204, by a crest of the ratchet teeth 201C as shown in FIG. 4C. Therefore, the setting lever 203 which is integrally formed with the ratchet pawl 202 urges the battery existence transmitting lever 100 to rotate in the direction of the arrow in FIG. 4C. Then, the first winding locking lever 701 of the winding prevention mechanism 70 is rotated counterclockwise while the second locking lever 702 is rotated clockwise. At this moment, the other end 702B of the second winding locking lever 702 is attracted to the magnet 703B of the locking control device 703 through the movable element 703A. Also, the double winding preventing mechanism 70 is held in the reset state to prevent the winding operation.

As the winding lever 10 is rotated in the returning direction, the ratchet wheel 201 is rotated in the returning direction together with the winding lever 10 in intermittent engagement with the ratchet pawl 202 and the state is returned to the one shown in FIG. 4A. If the winding lever 10 is released when the winding lever 10 reaches its winding end position, the winding lever 10 is automatically returned to the winding start position by a returning spring (101a). In this state, the discrete value of the counter 903 does not reach the value corresponding to the fed amount from the film start mark to the pre-stop position. Therefore, it is necessary to feed the film further by rotating the winding lever 10 to effect a winding operation again.

According to the re-execution of the winding operation of the winding lever 10 from its winding start position, the exciting coil 703C of the locking control device 703 in the double winding preventing mechanism 70 is instantly energized in response to the ON signal which is supplied when the second preliminary angular switch 120 is turned ON. The second preliminary angular switch 120 is turned ON after the first preliminary angular switch 110 is turned OFF by the protrusion 201D of the ratchet wheel 201. As the exciting coil 703C is excited, the attractive force of the magnet 703B decreases instantaneously, therefore the second winding locking lever 702 which is attractively held at the reset position with the magnet 703B, is rotated to the position indicated by the solid line in FIG. 1 by the spring 707. Meanwhile, the first winding locking lever 701 is rotated to the position indicated by the solid line in FIGS. 1, 4A and 4B. Then the second engagement arm 701B is retracted from the position where the ratchet pawl 202 engages the spring hooking dowel 202B. Thus, the winding operation of the winding lever 10 becomes possible.

Accordingly, a further rotation of the winding lever 10 in the winding direction effects the film winding operation. When the discrete value of the counter, which counts the advancing amount of the film, reaches the value corresponding to the pre-stop position, a reset cancel command signal is supplied from the arithmetic and control device 904 to the retaining control device 604 of the film advance stop mechanism 60. Thereby the exciting coil 604C is instantaneously energized to be excited, and the attractive force of the magnet 604B is decreased instantaneously. Therefore, the retaining lever 602 which is attractively held at the reset position with the magnet 604B is rotated clockwise by the torsion spring 603 in FIG. 1, and the retaining lever 602 engages the ratchet wheel 307.

Thus, the feeding of the film in connection with the winding operation of the winding lever 10 is interrupted, even if it is in the middle of winding the winding lever 10. When the winding lever 10 is released in the middle of the winding operation of the winding lever 10, a tip of the ratchet pawl 202 engages a root of the ratchet teeth 201C of the ratchet wheel 201 as shown in FIG. 4B. The return rotation of the ratchet wheel 201 is then locked, and the winding lever 10 is prevented from returning from the middle of winding.

Next, an operation in which the film is advanced frame-by-frame during actual photographing after completion of the film loading will be described.

When the winding lever 10 is rotated after the film has been fed to the pre-stop position, the protrusion 201D of the ratchet wheel 201, which is rotated together with the lever 10, comes into contact with the first preliminary angular switch 110 and turns the same ON. The ON signal is used as an enabling signal for permitting the shutter release operation (described later). Subsequently, as the first preliminary angular switch 110 is turned OFF in connection with the winding operation of the winding lever 10, the OFF signal causes instantaneous energizing of the exciting coil 802C (exciting the exciting a.1 802c) of the charge permitting control device 802 in the charge permitting mechanism 80. Thus, the attractive force of the magnet 802B is instantaneously decreased. As a result, as the attractive retention to the reset position against the charge permitting lever 801 is lost, the charge switching lever 403, biased counterclockwise by the spring (402a), is rotated counterclockwise. Then, the hook 403A is retained at a position for engaging the charge switching pin 404 of the ratchet wheel 201 which is rotated together with the winding lever 10.

Subsequently, when the second preliminary angular switch 120 is turned ON, the ON signal causes electric power to flow to the photointerrupter 902, the counter 903, and the arithmetic and control device 904 of the film feeding amount detecting device 90. Consequently, the film feeding amount detecting device 90 is activated.

Accordingly, when the winding lever 10 is further rotated in the winding direction, the main winding gear 401 is rotated in the film winding direction with the ratchet wheel 201 after the charge switching pin 404 and the main winding gear 401 are engaged with respect to each other. By transmitting this rotation to a charge gear train of the shutter charging driving system 40, the leading and trailing curtain of a known focal plane shutter are charged. In tandem with this, the rotation of the main winding gear 401 is also transmitted to the mirror charge driving system 50 to charge a known quick return mirror mechanism.

During the period from the time of the completion of the film loading to the pre-stop position until the first frame of the film reaches a position to face the aperture of the camera body, the reset state of the double winding preventing mechanism 70 is cleared by turning ON the second preliminary angular switch 120. Thereby, one-frame advance of the film after the completion of feeding the film to the pre-stop position becomes possible. In addition, as the ratchet wheel 201 rotates together with the winding lever 10 in the return direction, the charge switching pin 404 engages the stepped portion 403B of the charge switching lever 403 to rotate the main winding gear 401 in the returning direction. It then returns to its original position.

On the other hand, in connection with the operation of the film advance driving system 30 responsive to the winding operation of the winding lever 10, the film is wound up by the spool which rotates with the ratchet wheel 307.

The photointerrupter 902 optically detects the light-shadow change of the light and shadow pattern 901A, and the counter 903 counts pulses supplied in response to the rotational angular movement of the roller 901. When the discrete value obtained by the counter 903 reaches the film feeding amount corresponding to one frame length, the arithmetic and control device 904 supplies a reset cancel command signal to the retaining control device 604 of the film advance stop mechanism 60. Thereby, the exciting coil 604C is instantaneously energized to be excited, and the attractive force of the magnet 604B is decreased instantaneously. Thus, the retaining lever 602, which is attractively held at the reset position with the magnet 604B, is released.

In connection with this, the retaining lever 602 is rotated clockwise, as viewed in FIG. 1, by the torsion spring 603 and the retaining lever 602 engages the ratchet wheel 307. Thus, the ratchet wheel 307 is locked and the film winding is stopped.

In this case, even if the ratchet wheel 307 is locked during the winding operation of the winding lever 10, the winding operation of the winding lever 10 is possible because the friction clutch (not shown) for coupling between the ratchet wheel 307 and the gear 306 slips.

When the winding lever 10 is rotated in the returning direction through an angle corresponding to the second cutout portion 201B after the winding lever 10 has reached the winding end position thereof, as shown in FIG. 4C, the ratchet pawl 202 is rotated counterclockwise or in the first direction while resisting the spring 204 by a crest of the ratchet teeth 201C. Therefore, the setting lever 203, which is integrally formed with the ratchet pawl 202, urges the battery existence transmitting lever 100 to rotate in the direction of the arrow in FIG. 4C. Also, the first winding locking lever 701 of the winding prevention mechanism 70 is rotated counterclockwise while the second locking lever 702 is rotated clockwise. Thereby the other end 702B of the second winding locking lever 702 is attracted to the magnet 703B of the locking control device 703 through the movable element 703A, and the double winding preventing mechanism 70 is held in the reset state for preventing the winding operation.

Consequently, when the winding operation is applied to the winding lever 10 again without the shutter being released, the spring hooking dowel 202B of the ratchet pawl 202 comes into contact with the second engagement arm 701B. Thus, the clockwise rotation of the ratchet pawl 202 is prevented. Accordingly, the counterclockwise rotation of the ratchet wheel 201 is locked, and the rotating operation of the winding lever 10 in its winding direction is restrained. Thus, the winding of the film is prevented.

When the winding lever 10 is returned to its winding start position, as a cam portion 201E of the ratchet wheel 201 is engaged with the reset lever 804 of the charge permitting mechanism 80, as shown in FIGS. 1 and 3, the charge permitting lever 801 is rotated clockwise and allowed to be attracted to the magnet 802B of the charge permitting control device 802. Thereby the charge switching lever 403 is held in the reset state in which a hook 403A of the charge switching lever 403 is retracted and charging is not permitted.

When the shutter is released by operating a release button (908 in FIG. 5), the leading and trailing curtains of the focal plane shutter 907 move so that an exposure of the film is executed. Further, a sensor (906) detects a signal supplied in response to the shutter release operation, for example, the completion of the movement of the trailing curtain 907a. A CPU (905) receives the signal and issues a command to the electromagnetic coil 703C to energize. Thus, the reset state of the double winding preventing mechanism 70 is cleared.

When the winding lever 10 is returned to its winding start position, the retaining lever 602 is rotated counterclockwise, as viewed in FIG. 1. Also, the retaining lever 602 is attractively held with the magnet 604B of the retaining control device 604 in the film advance stop mechanism 60 and the reset state of the film advance stop mechanism 60 is recovered. Thereby the subsequent film winding operation becomes possible.

In the above embodiment as mentioned above, the double winding preventing mechanism 70, which operates in cooperation with the ratchet mechanism which is operatively associated with the rotation of the winding lever 10 between its winding start and end positions, includes a first winding locking lever 701, a second winding locking lever 702, and a locking control device 703. When the winding lever 10 returns from its winding end position to its winding start position, the first winding locking lever 701 is pivotally moved to the position for inhibiting the rotation of the ratchet pawl 202 toward the first direction in connection with the rotation of the ratchet pawl 202 in the second direction in response to the rotation of the ratchet wheel 201. This rotation inhibiting position of the first winding locking lever 701 is held by attracting the second winding locking lever 702 to the magnet 703B so that the reset state in which the winding operation of the winding lever 10 is prevented from being maintained. The reset state is cleared by instantaneously energizing the electromagnetic coil 703C in response to the signal supplied at a shutter release operation for decreasing the attractive force of the magnet 703B. Consequently, the mechanical structure of the double winding preventing mechanism 70 can be simplified and the cost can be decreased.

Further, in the above embodiment, the battery existence transmitting lever 100, which operates in response to the existence of the camera battery, is pivotally provided. When the battery does not exist, the battery existence transmitting lever 100 pivotally moves the first locking lever 701 to the position for restraining the rotation of the ratchet pawl 202 toward the first direction. This rotation inhibiting position is maintained by attracting the second winding locking lever 702 to the magnet 703B of the locking control device 703. Thus, the rotation inhibiting position holds the reset state in which the winding operation of the winding lever 10 is not allowed. Consequently, film winding when there is no electric source (no battery) is prevented and a useless film advance can be prevented.

Still further, in the above embodiment, the film advance stop mechanism 60 locks the spool rotation of the film advance driving system 30 in accordance with a signal. The signal is issued by the retaining control device 604 when the film feeding amount detecting device 90 detects the feeding amount of the film is a predetermined film feeding amount. Thereby a simplification of the mechanical structure of the film advance stop mechanism 60, a reduction in cost, and a stable film advance control not influenced by the accuracy of components, can be implemented.

Still further, in the above embodiment, the charge permitting mechanism 80 holds the shutter charge driving system 40 and the mirror charge driving system in an inoperative state during the feeding of the film when loading with the winding operation of the winding lever 10. Also, the charge permitting mechanism 80 holds the shutter charge driving system 40 and the mirror charge driving system in an operative state during the frame-by-frame advancing of the film.

The charge permitting mechanism 80 is electrically controlled by the charge permitting control device 802 consisting of the magnet 802B and a demagnetizing electromagnetic coil 802C. Consequently, simplification of the mechanical structure of the charge permitting mechanism 80, cost reduction, and a stable film advance control not influenced by the accuracy of components, can be achieved.

What is claimed is:

1. A manual film winding device of a camera, comprising:

a winding lever which is manually rotated between a winding start position and a winding end position;

a ratchet mechanism having a ratchet wheel, which is rotated in association with said rotation of said winding lever, and a ratchet pawl which engages with said ratchet wheel;

said ratchet wheel being rotated in a winding direction when said winding lever is rotated from said winding start position to said winding end position and said ratchet wheel being rotated in a reverse direction, opposite to said winding direction, when said winding lever is rotated from said winding end position to said winding start position;

a film advance driving system operated in association with said rotation of said ratchet wheel in said winding direction;

said ratchet pawl being arranged to rotate in a first direction in connection with said winding rotation of said ratchet wheel, and to rotate in a second direction, opposite to said first direction, in connection with said reverse rotation of said ratchet wheel;

a double winding preventing mechanism for restraining said rotation of said ratchet pawl in said first direction to prevent said ratchet wheel from rotating in said winding direction; and a controller that controls the double winding preventing mechanism to hold said ratchet pawl in a reset state, in which said rotation of said ratchet pawl in said first direction is restrained, and said controller further providing a signal for clearing said reset state, said signal being supplied in response to a release operation of a shutter.

2. The manual film winding device of a camera according to claim 1, wherein said shutter comprises a focal plane shutter having a leading curtain and a trailing curtain, and wherein said signal which is supplied in response to said shutter release operation is a travel completion signal of said trailing curtain.

3. The manual film winding device of a camera according to claim 1, wherein said ratchet mechanism is configured such that said ratchet pawl is retained against said ratchet wheel when said winding operation of said winding lever is stopped between said winding start position and said winding end position thereby preventing a returning movement of said winding lever toward said winding start position.

4. The manual film winding device of a camera according to claim 1, wherein said double winding preventing mechanism comprises a first winding locking lever, said first winding locking lever being rotated to a locking position by said rotation of said ratchet pawl in said second direction, said locking position being a position where said rotation of said ratchet pawl toward said first direction is prevented by said first locking lever, and wherein said first winding locking lever is arranged to be engaged with said ratchet pawl to lock said rotation of said ratchet wheel so that said rotation of said winding lever in said winding direction is prevented.

5. The manual film winding device of a camera according to claim 4, wherein said double winding preventing mechanism further comprises a second winding locking lever, having one end which is coupled to said first winding locking lever and an other end which is coupled to said controller, said second winding locking lever being arranged to hold said ratchet pawl in said reset state by transmitting the motion of said first winding locking lever to said controller when said first winding locking lever is rotated to said position where said rotation of said ratchet pawl toward said first direction is prevented, said second winding locking lever further being arranged to rotate said first winding locking lever to said other position for not restraining said rotation of said ratchet pawl toward said first direction in connection with a reset clearing operation of said controller.

6. The manual film winding device of a camera according to claim 4, wherein said first winding locking lever is biased toward a position where said rotation of said ratchet pawl toward said first direction is prevented.

7. The manual film winding device of a camera according to claim 1, further comprising a battery existence transmitting lever which operates in response to existence or non-existence of a battery in said camera, said battery existence transmitting lever bringing said double winding preventing mechanism into said reset state when no battery is loaded.

8. The manual film winding device of a camera according to claim 1, wherein said controller comprises:

a movable element which is coupled to said double winding preventing mechanism and brings said double winding preventing mechanism into said reset state;

a magnet for holding said reset state by attracting said movable element; and an electromagnetic coil for clearing said reset state by decreasing an attractive force of said magnet by passing a current through said coil in response to a signal supplied when said shutter is released.

9. The manual film winding device of a camera according to claim 1, further comprising at least one of a shutter charge driving system and a mirror charge driving system which operates in association with said rotation of said winding lever from said winding start position to said winding end position.

10. The manual film winding device of a camera according to claim 1, further comprising:

a film advance stop mechanism for stopping film movement by said film advance driving system when a film advancing amount fed by said film advance driving system reaches a predetermined amount;

film feeding amount detector for detecting the film feeding amount by said film advance driving system; and second controller for controlling said film advance stop mechanism in response to a signal which is supplied when said film advancing amount detecting means detects said predetermined film feeding amount.

11. A manual film winding device of a camera, comprising:

a winding lever which is manually rotated between a winding start position and a winding end position;

a film advance driving system which is operated in association with a winding operation of said winding lever;

a shutter charge driving system which is operated in association with said winding operation of said winding lever;

a coupling mechanism for providing a coupled state in which said winding lever and said shutter charge driving system are connected so that said shutter charge driving system is operatively associated with said winding operation of said winding lever, and an uncoupled state in which said winding lever and said shutter charge driving system are separated so that said shutter charge driving system is not operatively associated with said winding operation of said winding lever;

a charge permitting mechanism which brings said coupling mechanism into said uncoupled state when the film advance driving system feeds the film to a pre-stop position where one-windup length is left from a loading starting position and brings said coupling mechanism into said coupled state when the film advance driving system advances the film frame-by-frame from said pre-stop position in a shutter charge possible state; and a controller that controls said charge permitting mechanism.

12. The manual film winding device of a camera according to claim 11, wherein said coupling mechanism comprises a pin which is provided on said winding lever eccentrically from a pivoting axis of said winding lever and a charge switching lever which is pivotally mounted on said shutter charge driving system, engageable to and disengageable from said pin, said charge switching lever being biased toward a direction to be engaged with said pin.

13. The manual film winding device of a camera according to claim 11, wherein said charge permitting mechanism is arranged to bring said coupling mechanism into said uncoupled state in association with said winding lever when said winding lever is returned from said winding end position to said winding start position thereof.

14. The manual film winding device of a camera according to claim 11, wherein said charge permitting mechanism comprises a charge permitting lever which is pivotally moved for detaching said charge switching lever from a pin, said charge permitting lever being arranged to be controlled by said control means between a state to be engaged with said pin and a state to be disengaged from said pin.

15. The manual film winding device of a camera according to claim 11, further comprising a film feeding amount detector for detecting the film feeding amount wound up by said film advance driving system, said film feeding amount detector supplies said control means with a signal for setting said shutter charge possible state when said film feeding amount detecting means detects that the film is fed to the pre-stop position where one-windup length is left from a loading starting position upon loading a film.

16. A manual film winding device of a camera, comprising:

a winding lever which is manually rotated between a winding start position and a winding end position to define a winding operation;

a film advance driving system operated in association said winding operation of said winding lever;

a shutter charge driving system operated in association with said winding operation of said winding lever;

a mirror charge driving system which is operated in association with said winding operation of said winding lever;

a driving mechanism for driving said shutter charge driving system and said mirror charge driving system in association with the rotation of said winding lever from said winding start position to said winding end position;

a double winding preventing mechanism which prevents double advancing of a film by holding said winding lever in a locking state unless a shutter, which is charged by said shutter charge driving system, is released;

a controller that controls the double winding preventing mechanism to hold said winding lever in an inoperable state in which rotation of said winding lever from said winding start position to said winding end position is prevented by the movement of said winding lever from said winding end position to said winding start position; and a clearing system that clears said inoperable state of said controller so that said winding lever is rotatable from said winding start position to said winding end position in response to a signal supplied by said controller when said shutter is released, wherein the controller comprises a movable element coupled to said double winding preventing mechanism and brings said double winding preventing mechanism into said reset state; a magnet for holding said reset state by attracting said movable element; and an electromagnetic coil for clearing said reset state by decreasing an attractive force of said magnet by passing a current through said coil in response to the signal supplied when said shutter is released.

17. A manual film winding device of a camera, comprising:

a winding lever which is manually rotated between a winding start position and a winding end position to define a winding operation;

a film advance driving system operated in association with said winding operation of said lever;

a shutter charge driving system operated in association with said winding operation of said winding lever; and a mechanism that selectively separates said winding lever and said shutter charge driving system, said winding lever and said shutter charge driving system being separated by said mechanism when a film is fed to a pre-stop position at which one windup length is left from a loading starting position upon loading the film in association with said winding operation of said winding lever; and said shutter charge driving system being operatively associated, by said mechanism, with said winding operation of said winding lever when the film is fed frame by frame from said pre-stop position.

18. A manual film winding device of a camera, comprising:

a winding lever which is manually rotated between a winding start position and a winding end position;

a film advance driving system which is operated in association with a winding operation of said winding lever;

a shutter charge driving system which is operated in association with said winding operation of said winding lever;

a coupling mechanism for providing a coupled state in which said winding lever and said shutter charge driving system are connected so that said shutter charge driving system is operatively associated with said winding operation of said winding lever, and an uncoupled state in which said winding lever and said shutter charge driving system are separated so that said shutter charge driving system is not operatively associated with said winding operation of said winding lever;

a charge permitting mechanism which brings said coupling mechanism into said uncoupled state when the film advance driving system feeds the film to a pre-stop position where one-windup length is left from a loading starting position and brings said coupling mechanism into said coupled state when the film advance driving system advances the film frame-by-frame from said pre-stop position in a shutter charge possible state; and a controller that controls said charge permitting mechanism, the controller comprising a movable element which is coupled to said charge permitting mechanism and brings said charge permitting mechanism into said shutter charge possible state, a magnet for holding said shutter charge possible state by attracting said movable element, and an electromagnetic coil for clearing said shutter charge possible state by decreasing an attractive force of said magnet by passing a current through said coil in response to a signal supplied every time film is advanced frame-by-frame from the pre-stop position.

* * * * *